Jan. 24, 1967 D. MARSILI 3,299,835
RAVIOLI MAKING APPARATUS
Filed April 10, 1964 2 Sheets-Sheet 1
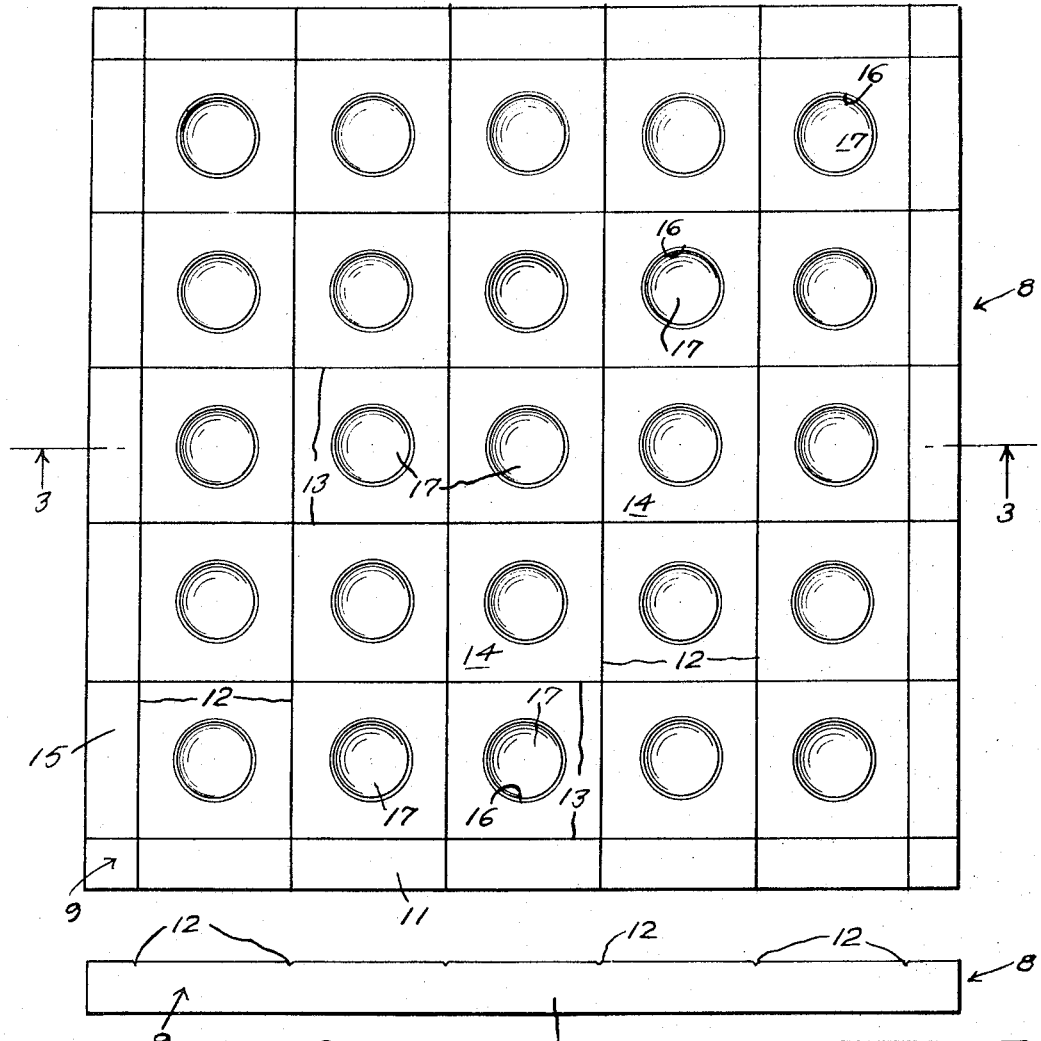
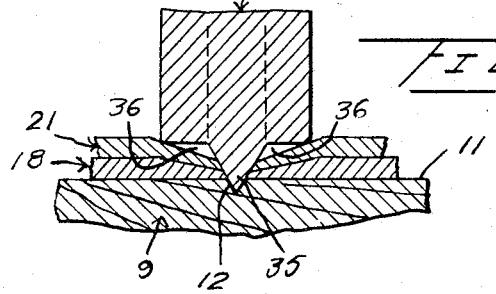
INVENTOR
DOMENICK MARSILI
BY John N. Randolph
ATTORNEY Jan. 24, 1967     D. MARSILI     3,299,835
RAVIOLI MAKING APPARATUS
Filed April 10, 1964     2 Sheets-Sheet 2
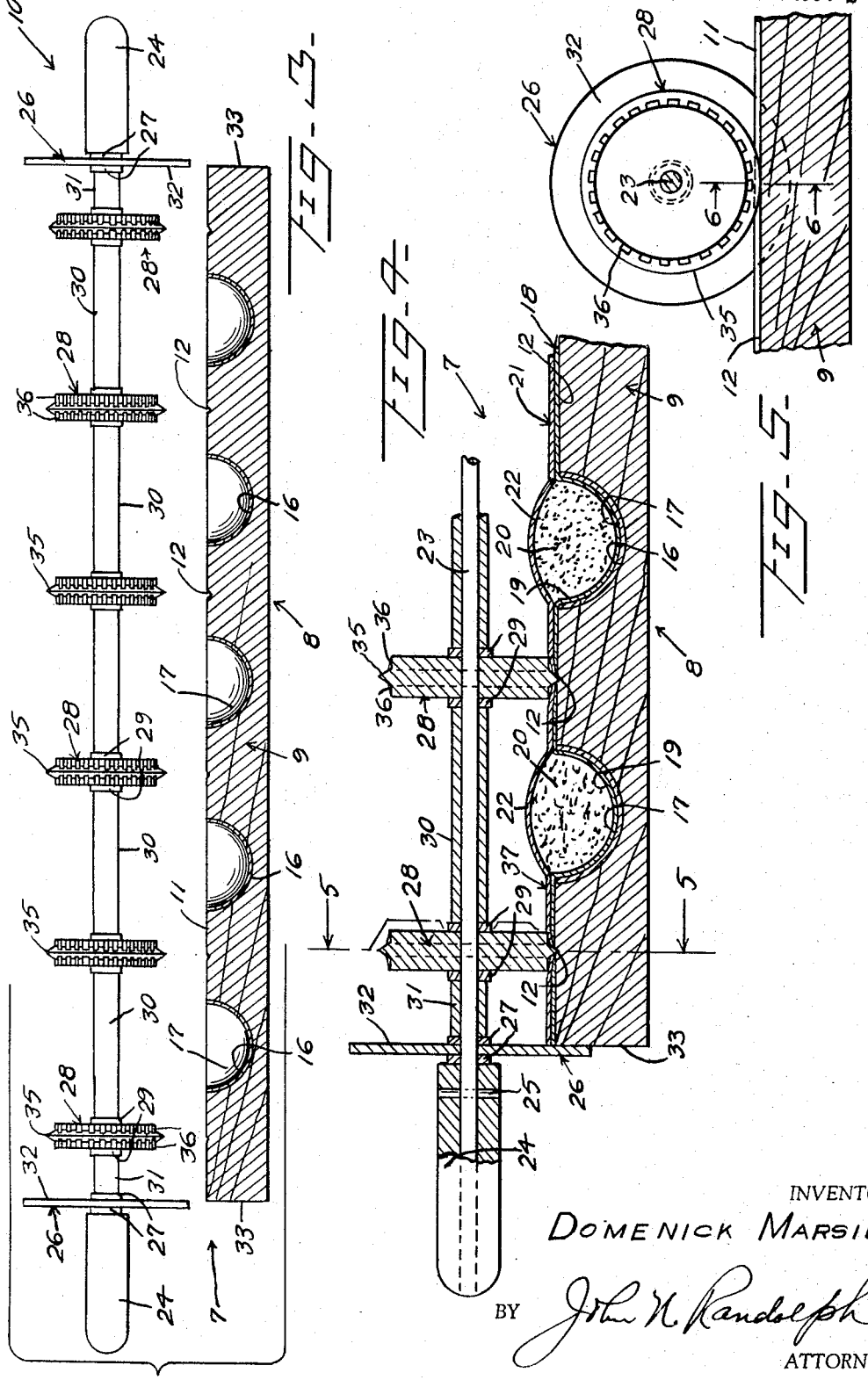
INVENTOR
DOMENICK MARSILI
BY John N. Randolph
ATTORNEY United States Patent Office 3,299,835
Patented Jan. 24, 1967

3,299,835
RAVIOLI MAKING APPARATUS
Domenick Marsili, 1343 Narauca Ave.,
El Cajon, Calif. 92020
Filed Apr. 10, 1964, Ser. No. 358,878
2 Claims. (Cl. 107—1)

This invention relates to an apparatus of extremely simple construction, by the use of which a number of ravioli may be quickly and efficiently produced.

More particularly, it is an object of the invention to provide a ravioli making apparatus including a member adapted to be covered with two layers or sheets of dough and having means for locating ravioli fillings between the dough layers in properly spaced relation to one another, so that when the dough is subsequently cut each of the fillings will be centrally disposed with respect to parts of the two dough layers constituting a ravioli casing.

Another object of the invention is to provide a ravioli making apparatus including a cutting member especially designed for use with said aforementioned member and by the use of which the two dough layers containing the ravioli fillings may be accurately cut into squares of equal size with each square having a centrally disposed filling.

Various other objects and advantages of the invention will hereinafter become more fully apparent from the following description of the drawings, illustrating a presently preferred embodiment thereof and wherein:

FIGURE 1 is a top plan view of a part of the apparatus which receives the dough and fillings from which the ravioli are formed;

FIGURE 2 is an edge elevational view thereof;

FIGURE 3 is an enlarged cross-sectional view taken substantially along a plane as indicated by the line 3—3 of FIGURE 1, and additionally showing the cutting unit of the apparatus in side elevation and in an elevated position;

FIGURE 4 is an enlarged fragmentary sectional view taken centrally through the entire apparatus, and showing all parts of the apparatus in an operative position;

FIGURE 5 is a fragmentary sectional view taken substantially along the line 5—5 of FIGURE 4, and FIGURE 6 is an enlarged fragmentary vertical sectional view, taken substantially along a plane as indicated by the line 6—6 of FIGURE 5.

Referring more specifically to the drawings, the ravioli making apparatus in its entirety as illustrated in FIGURE 3 is designated generally 7 and includes a base member, designated generally 8, on which the ravioli are formed, and a member designated generally 10, which is utilized with the member 8 for cutting the ravioli.

The member 8 comprises a substantially flat relatively thick piece 9 which is preferably formed of wood and which is square, as seen in FIGURE 1. An upper surface 11 of the member 9 is divided by equally spaced parallel grooves 12, and equally spaced parallel grooves 13, which intersect at right angles with the grooves 12, into a number of squares or areas 14 all of which are of the same size, and a square border 15 of uniform width which completely surrounds the area of the top surface 11 which is defined by the squares 14. Since the piece or member 9 is square and since each of the areas 14 is square, the surface 11 is provided with a corresponding number of rows or areas 14 in directions at a right angle to one another. As illustrated, surface 11 has five rows of squares or areas 14 in each direction, or a total of 25 of said squares or areas. The surface 11 has a depression or cavity 16, as best seen in FIGURES 3 and 4, disposed centrally of each square 14, and each of which is preferably concave and lined with a cup-like receptacle 17 which is preferably formed of metal.

A first or bottom layer or sheet of dough 18 is positioned to cover the surface 11 and portions 19 thereof sink into the receptacles 17. Said portions 19 are then filled with the ravioli fillings 20, the weight of which will cause the dough portions 19 to assume positions lining the receptacles 17, as seen in FIGURE 4. The layer or sheet of dough 18 is then completely covered by an upper layer or sheet 21 of dough, as seen in FIGURE 4. If the fillings 20 are heaped so as to protrude above the level of the lower sheet 18, portions 22 of the upper sheet 21 which cover the fillings 20 will be bulged upwardly.

The cutting unit 10 is then utilized for cutting the two dough sheets or layers 18 and 21 and is especially constructed to function with the member 9 for accomplishing this operation. The cutting unit 10 includes a long shaft or axle 23. Handles 24 disposed on the ends of the shaft 23 and may be secured thereto in any suitable manner, as by pins 25 which extend transversely through the shaft and handles. A large flat disc or wheel 26, constituting a guide wheel, is journalled on the shaft 23 adjacent each handle 24 and between two washers 27, one of which is disposed between said wheel and the adjacent handle. Six corresponding dough cutting and crimping wheels 28 are journalled on the shaft 23 between the guide wheels 26 and in spaced apart relation to one another and to said guide wheels. Each wheel 28 is straddled by two washers 29 which are mounted on the shaft 23, and spacing sleeves 30 are disposed on the shaft 23 between the wheels 28. Thus, between each two adjacent wheels 28 is located a spacing sleeve 30 and two washers 29 which are disposed between the ends of the sleeve and said wheels. A short spacing sleeve 31 is disposed between each guide wheel 26 and the wheel 28 located adjacent thereto, with one end thereof abutting a washer 29 and its other end abutting a washer 27.

The guide wheels 26 are spaced apart a distance such that the inner faces 32 thereof simultaneously engage either the two opposite side edges 33 of the member 10 which are disposed parallel to the grooves 12, or the other two opposite side edges 34 which are disposed parallel to the grooves 13.

As seen in FIGURES 3 and 4, the diameter of each wheel 28 is substantially less than the diameter of each guide wheel 26, and each wheel 28 has a beveled cutting edge 35 which extends completely around the periphery thereof and which is located midway of the opposite sides of said wheel. Each wheel 28 has fluted and beveled ring portions 36 which straddle the beveled cutting edge 35 and which are slightly smaller in diameter than the cutting edge 35, as seen in FIGURES 3 to 6.

Wheels 28 are so spaced relative to one another and to the guide wheels 26, by the sleeves 30 and 31 and the washers 27 and 29, that when the inner faces 32 of the wheels 26 are abutting the edges 33, for example, the wheels 28 will be correctly disposed so that their cutting edges 35 will engage in the grooves 12, as seen in FIGURE 4. Thus, the cutter 10 may be manually operated by grasping the two handles 24 and moving it from one of the sides 34 to the other side 34 with the guide wheel faces 32 engaging the edges 33 for cutting the dough sheets 18 and 21 into five strips, due to the wheel peripheries 35 rolling in the grooves 12 for cutting through the two dough layers. In addition, the fluted peripheries 36 of the wheels 28 will simultaneously crimp the dough layers on each side of each cut. The cutter 10 is then turned ninety degrees and positioned with the guide wheel faces 32 abutting the edges 34, the aforedescribed operation is repeated for causing the circular cutting edges 35 to travel in the grooves 13, so that the wheels 28 will simultaneously cut and crimp the dough layers in the other direction, to form twenty-five corresponding ravioli 37, each of which is square and composed of two dough layers and which is crimped completely around its marginal edge, as seen at 38 in FIGURE 6, and which has a centrally disposed filling 20.

It will be readily obvious that the member 9 may be made in various sizes and have a greater or lesser number of squares 14. For example, the apparatus could be made smaller with the member 9 having three or four rows of squares 14 in each direction for a total of nine or sixteen, respectively, or it could be made larger with six or seven rows of squares 14 in each direction for a total of thirty-six or forty-nine, respectively. It will also be apparent that the length of the cutting unit 10 would vary for use with such member 9 and would be provided with either four or five wheels 28 for smaller members 9 and with seven or eight wheels 28 for the larger members 9. Additionally, the spacing between the grooves 12 and 13 may be increased or decreased to increase or decrease, respectively, the sizes of the ravioli 37, and the length of the spacing sleeves 30 would be similarly increased or decreased to vary the spacing between the cutting and crimping wheels 28, to accommodate the cutter 10 to the grooves 12 and 13 spaced such different distances apart.

Various other changes and modifications are contemplated and may obviously be resorted to, without departing from the function or scope of the invention as hereinafter defined by the appended claims.

I claim as my invention:

1. A ravioli making apparatus comprising a square base member having a top surface adapted to support two superimposed sheets of dough, said base member having edge walls surrounding the top surface and disposed perpendicular thereto, said base member having a plurality of depressions formed in said top surface adapted to receive portions of the bottom dough sheet and ravioli fillings disposed between the dough sheets for positioning the fillings in predetermined spaced relation to one another and to the edge walls, a manually actuated cutting unit including a shaft, handles fixed to the ends of said shaft, guide wheels journaled on the shaft between and adjacent said handles for simultaneously engaging parallel ones of the edge walls, and a plurality of cutting wheels journaled on said shaft between the guide wheels and in spaced apart relation thereto and to one another for cutting the dough sheets on opposite sides of rows of said fillings which are disposed parallel to said last mentioned edge walls when the cutting unit is manually propelled across the base member, each of said wheels including a beveled peripheral cutting edge and beveled fluted crimping edges straddling the cutting edge and of smaller diameter than said cutting edge for simultaneously cutting and crimping the dough sheets.

2. A ravioli making apparatus comprising a square base member having a top surface adapted to support two superimposed sheets of dough, said base member having edge walls surrounding the top surface and disposed perpendicular thereto, said base member having a plurality of depressions formed in said top surface adapted to receive portions of the bottom dough sheet and ravioli fillings disposed between the dough sheets for positioning the fillings in predetermined spaced relation to one another and to the edge walls, a manually actuated cutting unit including a shaft, handles fixed to the ends of said shaft, guide wheels journaled on the shaft between and adjacent said handles for simultaneously engaging parallel ones of the edge walls, and a plurality of cutting wheels journaled on said shaft between the guide wheels and in spaced apart relation thereto and to one another for cutting the dough sheets on opposite sides of rows of said fillings which are disposed parallel to said last mentioned edge walls when the cutting unit is manually propelled across the base member, said top surface of the base member having grooves extending parallel and perpendicular to said edge walls and forming a grid dividing said top surfaces into squares in each of which one of said depressions is centrally located, said cutting wheels engaging in parallel ones of the grooves when the guide wheels are engaging edge walls disposed parallel to said grooves.

References Cited by the Examiner
UNITED STATES PATENTS

| | | | |
|---|---|---|---|
| 2,386,993 | 10/1945 | Valdastri | 107—1 X |
| 2,905,532 | 8/1960 | Abdela. | |

FOREIGN PATENTS

| | | |
|---|---|---|
| 354,788 | 12/1937 | Italy. |

WALTER A. SCHEEL, *Primary Examiner.*

JOSEPH SHEA, *Assistant Examiner.*